US006948060B1

(12) United States Patent

Ramanathan

(10) Patent No.: US 6,948,060 B1
(45) Date of Patent: Sep. 20, 2005

(54) METHOD AND APPARATUS FOR MONITORING ENCRYPTED COMMUNICATION IN A NETWORK

(75) Inventor: Ramanathan Ramanathan, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 948 days.

(21) Appl. No.: 09/637,123

(22) Filed: Aug. 11, 2000

(51) Int. Cl.[7] .................... H04L 9/00
(52) U.S. Cl. .................... 713/153; 713/155; 713/170
(58) Field of Search .................... 713/153, 151, 713/155, 156, 176, 170; 380/30, 286; 705/54, 705/67, 80

(56) References Cited

U.S. PATENT DOCUMENTS 5,535,276 A * 7/1996 Ganesan .................... 713/155
5,615,269 A * 3/1997 Micali .................... 705/80
5,825,877 A * 10/1998 Dan et al. .................... 705/54
5,852,665 A * 12/1998 Gressel et al. .................... 380/30
6,058,188 A * 5/2000 Chandersekaran et al. .. 380/286
6,085,322 A * 7/2000 Romney et al. .................... 713/176
6,145,079 A * 11/2000 Mitty et al. .................... 713/170
6,253,322 B1 * 6/2001 Susaki et al. .................... 713/170
6,324,645 B1 * 11/2001 Andrews et al. .................... 713/157
6,336,186 B1 * 1/2002 Dyksterhouse et al. ..... 713/156
6,442,686 B1 * 8/2002 McArdle et al. .................... 713/151
2002/0007453 A1 * 1/2002 Nemovicher .................... 713/155
2002/0029200 A1 * 3/2002 Dulin et al. .................... 705/67

OTHER PUBLICATIONS

L.A. Sanchez, M.N. Condell, Security Policy Protocol, www.ietf.org/internet-drafts/draft-ietf-ipsp-spp-00.txt, Jul. 17, 2000, pp. 1-102.

* cited by examiner

*Primary Examiner*—Ayaz Sheikh
*Assistant Examiner*—A. Sherkat
(74) *Attorney, Agent, or Firm*—Michael R. Barre

(57) ABSTRACT

A method and apparatus for monitoring encrypted communications in a network comprising: establishing a network monitoring digital contract with a network monitoring element, establishing a network use digital contract with a first and a second network element; and transmitting decrypting information to the network monitoring element for decrypting encrypted communications between the first network element and the second network element per terms in the network monitoring digital contract and the network use digital contract.

17 Claims, 6 Drawing Sheets

METHOD AND APPARATUS FOR MONITORING ENCRYPTED COMMUNICATION IN A NETWORK

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

BACKGROUND OF THE INVENTION

1. Field of the Invention

The present invention is related to the field of networking. In particular, the present invention is related to a method and apparatus for monitoring encrypted communications in a network.

2. Description of the Related Art

Network security is a growing concern of organizations that employ networked computer systems. As a security measure, a corporation may wish to limit the communications between different groups of employees within the organization, or may desire to keep individuals from within the corporate structure from snooping in on the transmission of other employees within the corporation, or the corporation may wish to monitor the content of information that is transmitted between different employees within the corporate network.

A corporation may use a firewall to keep internal network segments secure and insulated from each other. For example, a research or accounting subnet might be vulnerable to snooping from within, and a firewall to prevent snooping may be employed.

A corporation may have in place a network policy (NP) as part of its security measures. A NP may include a communication scheme that defines which computers, or groups of computers are granted permission to communicate with each other, the type of encryption and authentication algorithms that are used by each computer, and the duration of time during which the encryption and authentication keys are valid. A NP may be installed on a policy server responsible for distributing and managing the NP on all network elements within its jurisdiction.

Traditionally a secret key such as the Data Encryption Standard (DES) standard that is well known in the art has been used to encrypt data. FIG. 1 illustrates a network element 203 transmitting an email message, and another network element 204 receiving the transmitted message using the same key to encrypt and decrypt messages. However, transmitting the secret key to the recipient poses a problem because the method employed in transferring the key from the sender to the receiver may not be secure. Moreover, even if a secure method were available to transmit the secret key from network element 203 to network element 204, network monitoring element 202 would be unable to monitor the encrypted communications between because it would not be in possession of the key. Alternatively, a corporation may use a public-key cryptography method, also well known in the art. This method uses both a private and a public key. Each recipient has a private key that is kept secret and a public key that is published. The sender looks up the recipient's public key and uses it to encrypt the message. The recipient uses the private key to decrypt the message. Thus, the private keys are not transmitted and are thereby secure. In this method too, a network monitoring element such as a network administrator will be unable to monitor the encrypted communications between two computers on the network as the network monitoring element is not in possession of the key that is needed to decrypt the data. The prior art fails to describe a method or an apparatus for monitoring encrypted communications in a network, by a network administrator or by a network element such as another computer that has the authority to do so.

DETAILED DESCRIPTION OF THE INVENTION

Described is a method and apparatus for monitoring encrypted communications in a network. In particular, the invention describes a method and apparatus for monitoring encrypted communications in a network comprising establishing a network policy (NP) on a policy server, establishing a network monitoring digital contract (NMDC) between the policy server and a network monitoring element, establishing a network use digital contract (NUDC) between the policy server and a first network element, establishing a NUDC between the policy server and a second network element, and monitoring communications between the first network element and the second network element, by the network monitoring element, in accordance with the network policy, the network monitoring digital contract, and network use digital contracts.

In the following description, numerous specific details are set forth in order to provide a thorough understanding of the present invention. It will be apparent, however, to one of ordinary skill in the art that the present invention may be practiced without these specific details. In other instances, well-known architectures, steps, and techniques have not been shown to avoid unnecessarily obscuring the present invention. For example, specific details are not provided as to whether the method is implemented in local area network (LAN), a wide area network (WAN), or across the Internet. Also, specific details are not provided as to whether the method is implemented as a software routine, hardware circuit, firmware, or a combination thereof. While the description that follows addresses the method as it applies to a Local Area Network (LAN) application, it is appreciated by those of ordinary skill in the art that the method is generally applicable to any network application including, but not limited to, internetworks (Internet), Metropolitan Area Networks (MANs), and Wide Area Networks (WANs).

Figure 1:
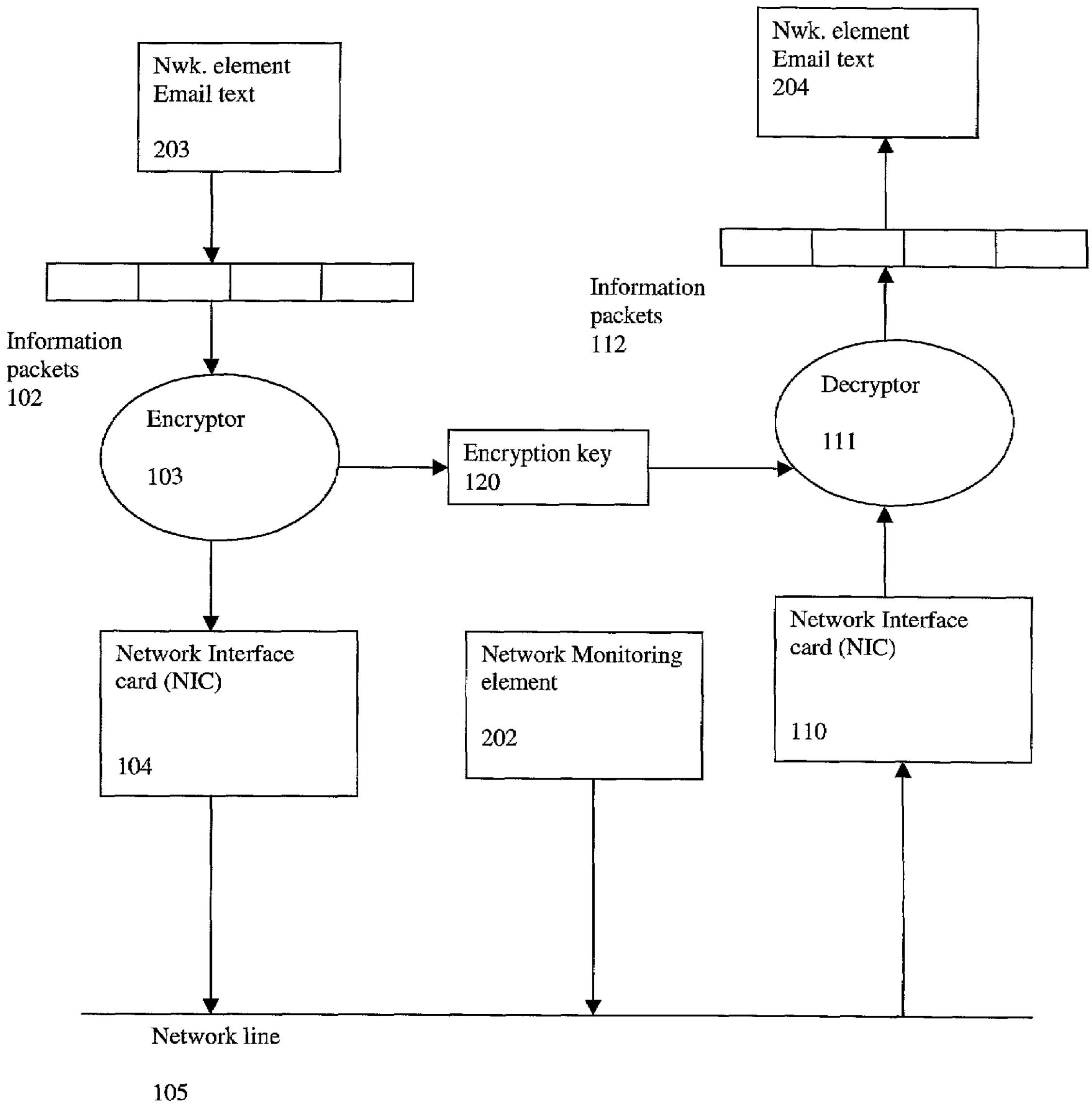
FIG. 1 illustrates an embodiment of a prior art system wherein data is encrypted.
Figure 2:
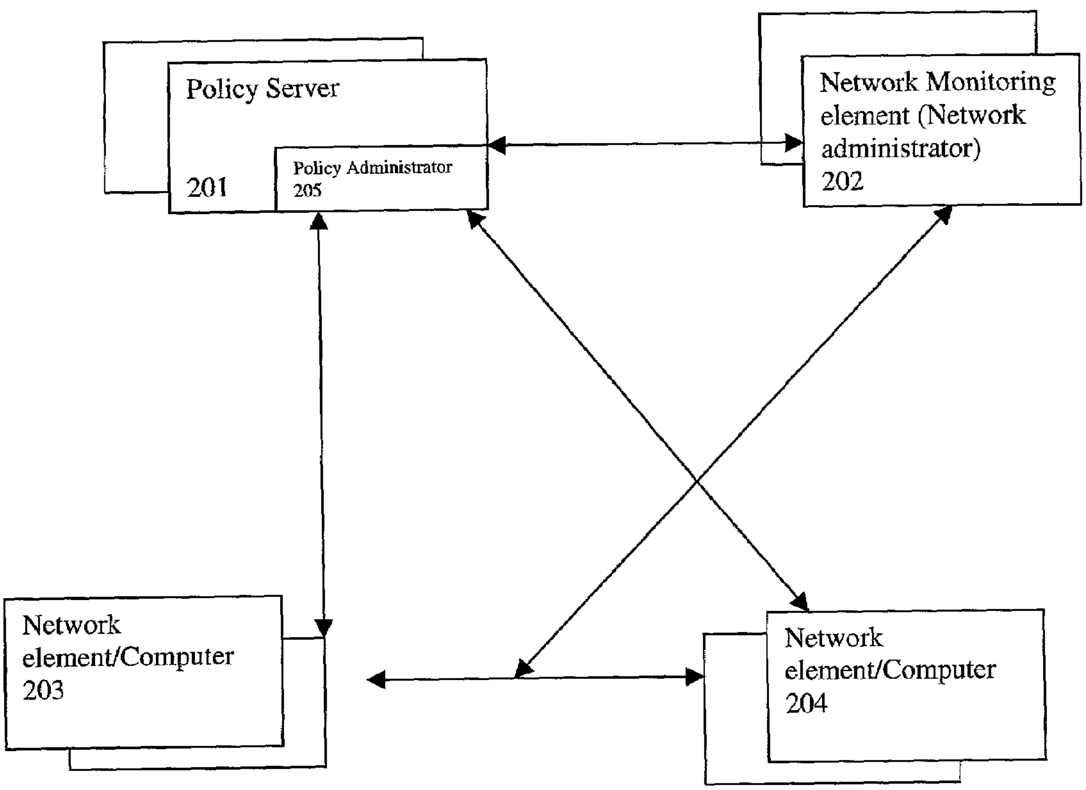
FIG. 2 illustrates an embodiment of the disclosed invention using a policy server and a policy administrator to monitor encrypted communications in a network.
Figure 3:
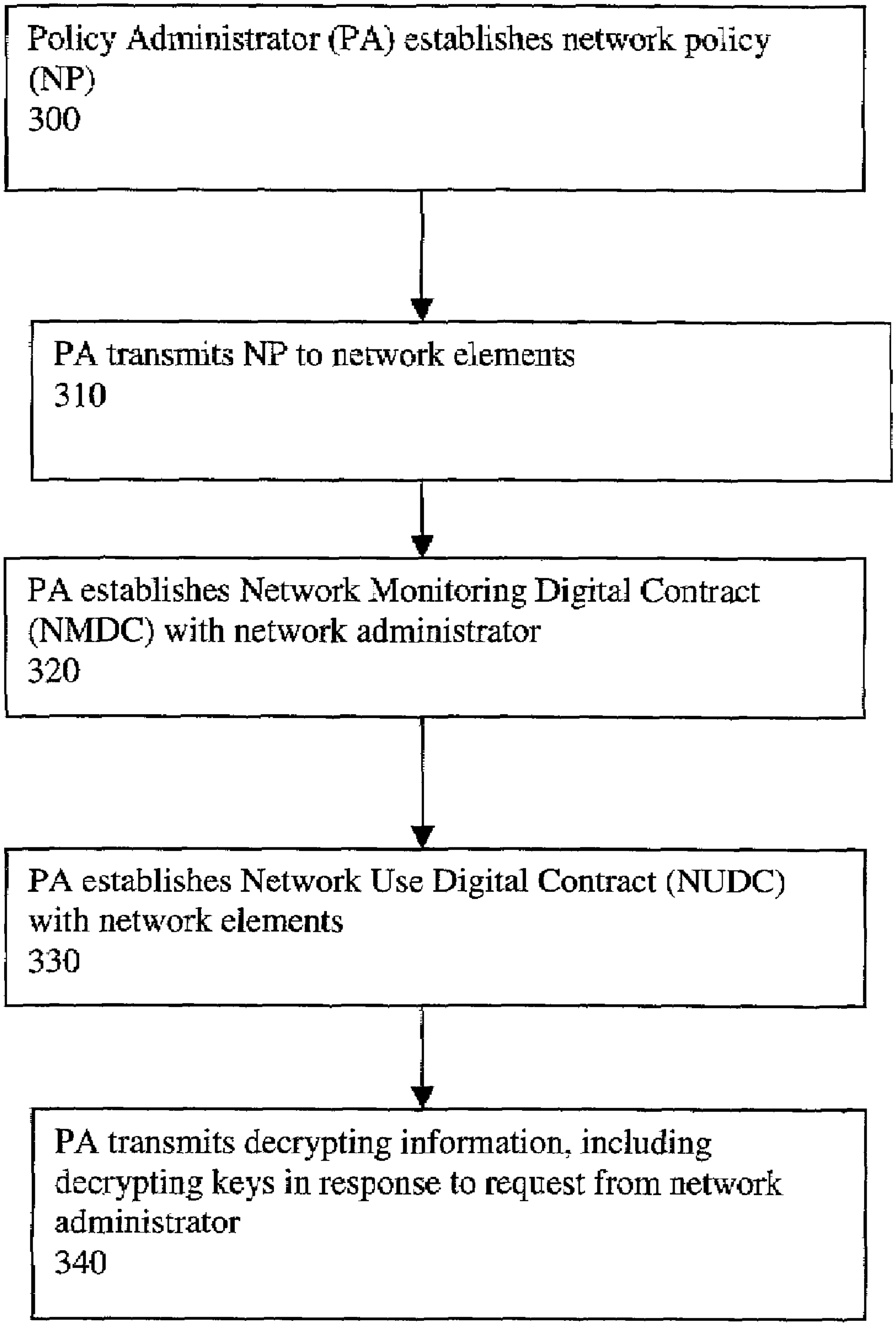
FIG. 3 is a flow diagram illustrating an overview of an embodiment of the invention.

In one embodiment, FIGS. 2 and 3 illustrate a network comprising a plurality of policy servers 201, a plurality of network monitoring elements 202, and network elements 203 and 204 (such as computers). At 300, a network policy (NP) is defined, distributed and administered by policy administrator 205. At 310 the policy administrator transmits the NP to each network element. A network element may only communicate with another network element in accordance with a particular communication rule defined in the NP. If two network elements are allowed to communicate with each other, the NP stipulates the type of encryption algorithm, authentication algorithm, the type of keys used for encryption and authentication, and the duration of time during which the keys are valid. The term network element as used here is generic and is to be construed to include any network element including computers, which may communicate with each other.

In 320, once the NP has been transmitted to each network element, a network monitoring element 202 that desires to monitor the communication between network elements 203 and 204, obtains a network monitoring digital contract (NMDC) from the policy administrator 205. Although the description that follows is for a network administrator to monitor communication between network elements, any network element that possesses the required authorization as indicated in the NP may monitor the communications between network elements. In one embodiment the policy administrator 205, and the network monitoring element 202, are physically located on the same device. In one embodiment, prior to issuing the NMDC, the policy administrator 205 authenticates the network administrator 202 by requesting from the network administrator its proof of identity. In one embodiment this proof of identity is a digital certificate. A digital certificate is the digital equivalent of an identity (ID) card used in conjunction with a public key encryption system. Digital certificates are well known in the art and are issued by third parties known as certification authorities (CAs) such as VeriSign, Inc., of Mountain View, Calif. After receiving the digital certificate from the network administrator 202 and after authenticating the network administrator, the policy administrator 205 requests and receives from the network administrator 202 the network administrator's authorization, which in one embodiment is a legal corporate authorization. The network administrator's authorization or legal corporate authorization validates the network administrator's authority to monitor network communications as specified in the NP. The authorization, or legal corporate authorization comprises a digital signature. A digital signature is an electronic signature that is well known in the art. The policy administrator authenticates the network administrator's digital signature. On receiving and authenticating both, the digital certificate that authenticates the network administrator, as well as the digital signature that validates the network administrator's authority to monitor network communications, the policy administrator 205 issues the network monitoring element a NMDC. The NMDC includes the digital certificate of the policy administrator 205, the digital certificate of the network administrator 202, the digital signature of the network administrator 202, the digital signature of the policy administrator 205, the date, the time, and the content of the transaction. In one embodiment the content of the transaction includes the type of decrypting information to be transmitted, including the decrypting keys needed for decrypting the encrypted communication between the communicating elements. The NMDC also includes the period during which the NMDC is valid. A copy of the NMDC is maintained on the policy administrator 205 prior to transmitting the NMDC to the network administrator 202. On receipt of the NMDC, the network administrator maintains a copy for future use.

The network administrator 202 transmits the NMDC to the policy administrator 205 each time the network administrator desires monitoring the communications between network elements. The policy administrator 205 verifies the validity of the NMDC and issues the network administrator the information it needs to decrypt the communication between the elements it intends to monitor. The aforementioned validation process is performed each time the network administrator desires monitoring the encrypted communications because the decryption keys could be different for each set of communicating elements. The network administrator has to renew its NMDC once the NMDC expires. The process to renew the NMDC is as explained above.

In addition to the NMDC, at 330, a second digital contract called the network use digital contract (NUDC) is established between each network element and the policy administrator 205. In particular, each network element registers itself with the policy administrator 205 as one of the policy server's clients and agrees to be bound by the rules in the NP and the NUDC. The NUDC includes the digital certificate of the registering network element 203, the digital certificate of the policy administrator 205, the digital signature of the policy server, the digital signature of the network element, the date, the time, the content of the transaction, and the period during which the NUDC is valid. In one embodiment a copy of the NUDC is maintained on the policy server and on the network element. The NUDC is valid as long as the network element follows the rules established by the NP and the NUDC. In one embodiment, if the network element chooses not to follow the established rules, a record of the infraction is maintained in its encryption and authentication log, a copy of the infraction is sent to the policy administrator, and the network element will not be able to communicate with other network elements on the network. In one embodiment, the content of the transaction in the NUDC includes establishing the authority for the policy administrator 205 to secretly access the encryption and authentication log and obtain the decryption information stored on the network element. Establishment of such authority may be performed using any one of a number of authorization techniques known in the art.

Figure 4:
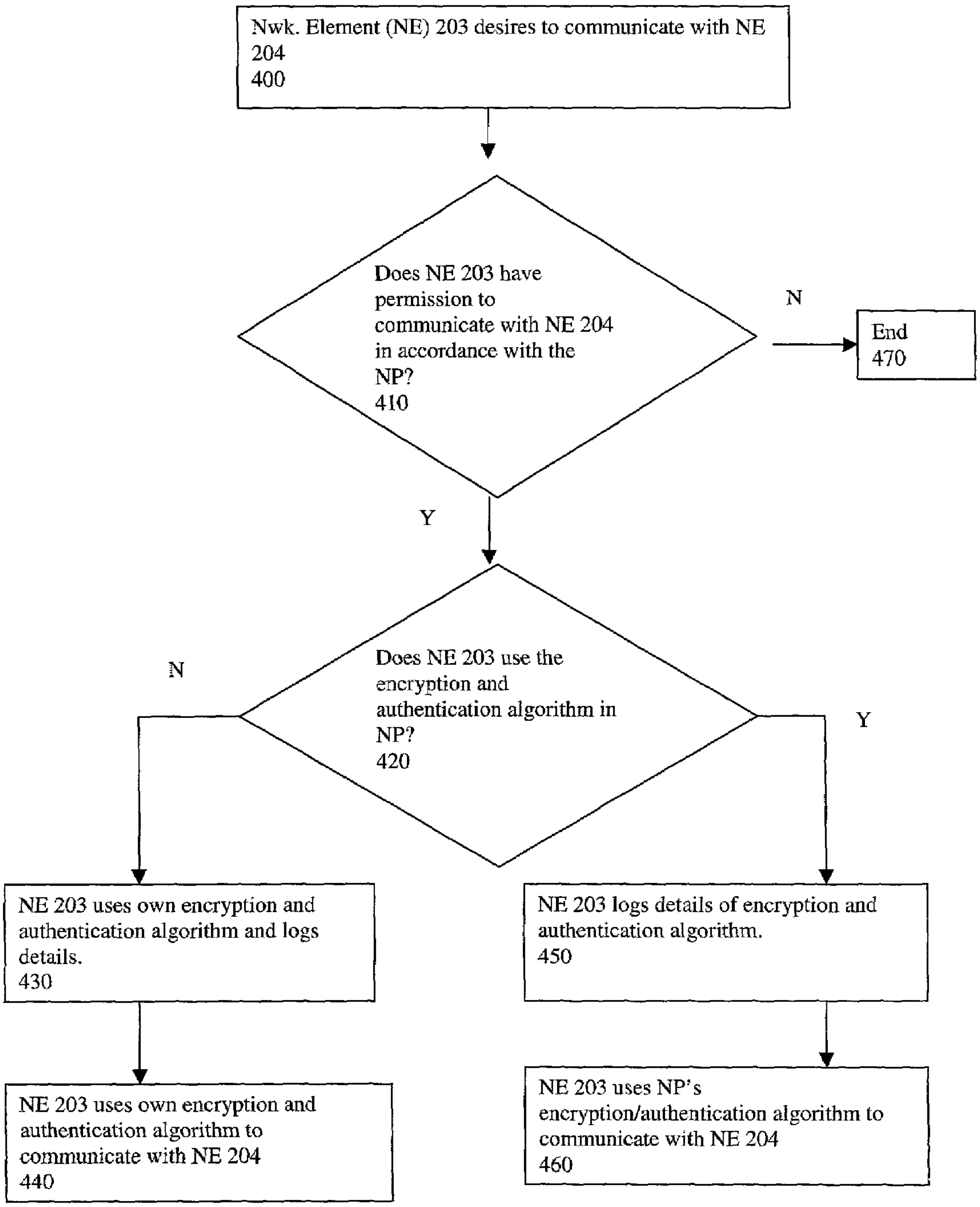
FIG. 4 is a flow diagram of the communication process between network elements.

Referring to FIG. 4, after the NP, the NMDC and the NUDC are in place, at 400 a network element 203 desires to communicate with another network element 204, at 410 network element 203 looks up the NP it received from the policy administrator 205 to determine if it has the authority to communicate with network element 204. If the authority to communicate exists, at 420, network element 203 determines whether to communicate with network element 204 using the encryption and authentication rules of the NP or its own encryption and authentication algorithm. At 430, network element 203 having decided to use its own encryption and authentication algorithm, logs the details of the encryption and authentication algorithms including any keys needed to decrypt the communications between network elements 203 and 204. In one embodiment, the logs stored on network element 203 are stored in an encrypted format. At 440, network element 203 after logging the encryption and authentication algorithm it intends using, including the decrypting keys, communicates with network element 204 in an encrypted format. At 450, network element 203 logs the encryption and authentication algorithm including the decrypting keys as specified by the NP. In one embodiment, the logs stored on the policy server are in an encrypted format. At 460, network element 203 uses the encryption and authenticating algorithm logged and communicates with network element 204.

Figure 5:
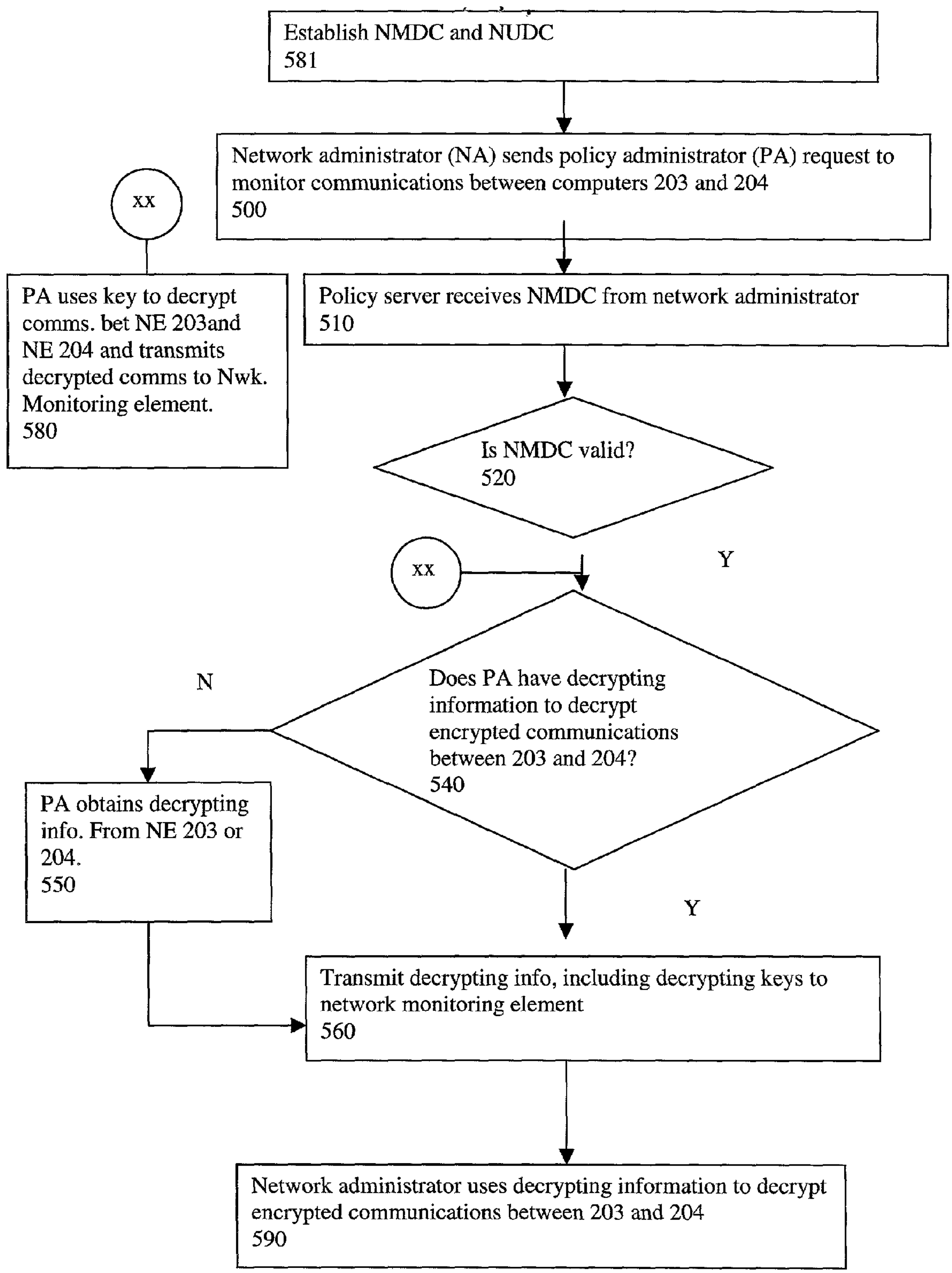
FIG. 5 is a flow diagram illustrating details of an embodiment of the invention.

Referring to FIG. 5, the process by which network administrator 202 monitors encrypted communications between network elements 203 and 204 will now be described. At 581, the NMDC and the NUDC have been established. At 500, network administrator 202 decides to monitor the communications between network elements 203 and 204. At 510, the policy administrator 205 receives the NMDC from the network administrator 202. At 520, the policy administrator 205 authenticates the NMDC. After determining that the NMDC is valid, at 540 the policy administrator determines whether it has the decrypting information in its own log. In one embodiment, decrypting information includes decrypting keys for decrypting the encrypted communications between the network elements. If the policy administrator has the decrypting information, at 560 the policy administrator transmits the decrypting information to network administrator 202. At 590, the network administrator uses the decrypting information obtained from the policy administrator to decrypt the encrypted communications between network elements 203 and 204. At 550, if policy administrator does not have the decrypting information in its log, it obtains the decrypting information from the log on network elements 203 or 204 and transmits the decrypting information to the network administrator 202. In another embodiment, at 580, policy administrator 202 decrypts the communication between network elements 203 and 204 and transmits the information to network administrator 202. This transfer of information is done via a secure link between the policy administrator 205 and the network administrator 202.

Figure 6:
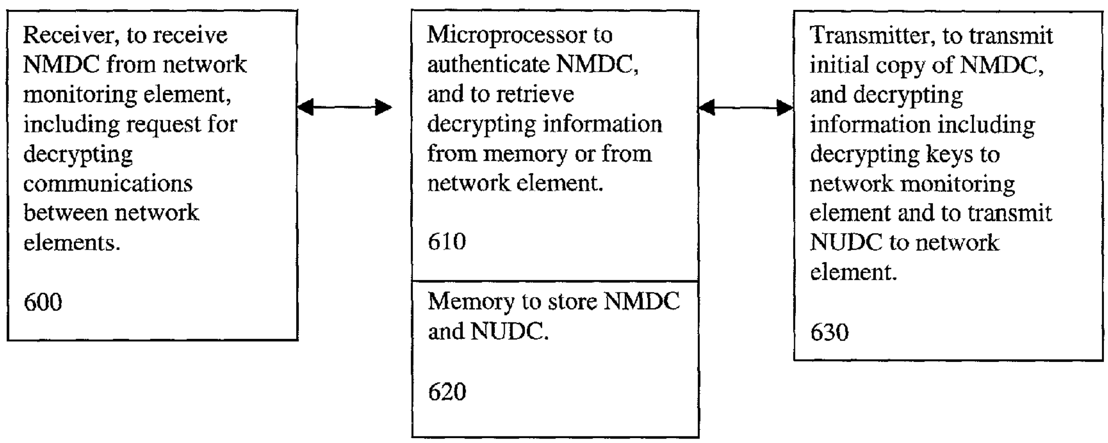
FIG. 6. illustrates a policy server comprising an embodiment of the invention.

FIG. 6 illustrates an apparatus of an embodiment of the invention. In particular, FIG. 6 illustrates a policy server in which an embodiment of the invention is employed. The apparatus comprises a receiver 600 to receive an NMDC from a network monitoring element and to receive a request for decrypting communications between network elements. Communicatively coupled to the receiver is a microprocessor 610 with a memory 620. The microprocessor 610 authenticates the NMDC and retrieves decrypting information either from memory 620 or from network elements. Communicatively coupled to the microprocessor 610 is a transmitter 630 for transmitting the initial copy of the NMDC to the network monitoring element, for transmitting a copy of the NUDC to a network element, and for transmitting decrypting information, including decrypting keys that are used by the network monitoring element to decrypt the encrypted communications between network elements. In one embodiment the microprocessor reads the logs containing the decrypting information on a network element, and obtains the decrypting keys, decrypts the communication between network elements and the transmitter transmits the decrypted communications to the network monitoring element.

Figure 7:
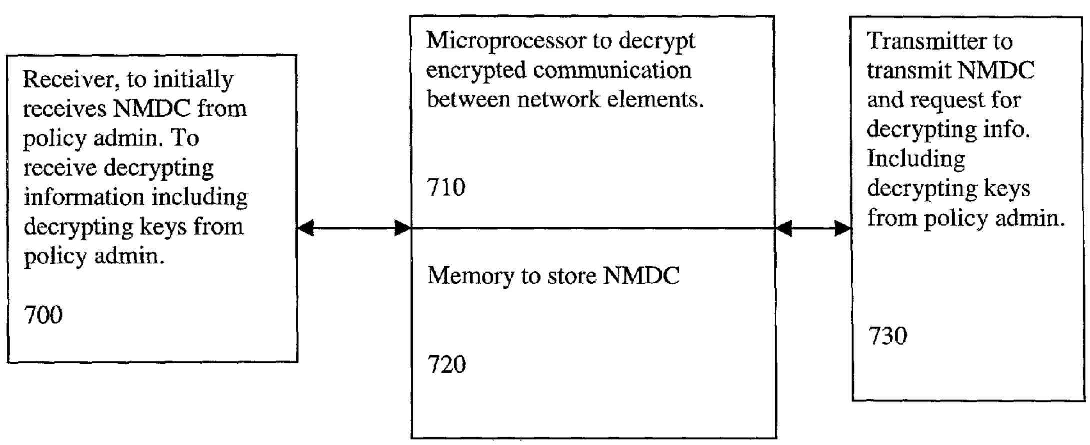
FIG. 7. illustrates a network monitoring element comprising an embodiment of the invention.

FIG. 7 illustrates an apparatus of an embodiment of the invention. In particular, FIG. 7 illustrates a network monitoring element in which an embodiment of the invention is employed. The apparatus comprises a receiver 700 to initially receive the NMDC from the policy administrator, and to subsequently receive decrypting information, including decrypting keys to decrypt the encrypted communication it receives between network elements. In one embodiment the receiver 700 receives the decrypted communications between network elements from the policy administrator. Communicatively coupled to the receiver 700 is a microprocessor 710 and a memory 720. The microprocessor uses the decrypting keys obtained from the policy administrator and decrypts the encrypted communication between network elements. The memory 720 stores a copy of the NMDC that the apparatus receives from the policy administrator. Communicatively coupled to the microprocessor and memory is a transmitter 730. The transmitter transmits a request to monitor encrypted communications between network elements, and then transmits the NMDC that is stored in memory 720 to the policy administrator.

Thus a method has been disclosed for monitoring encrypted communications in a network environment. Embodiments of the invention may be represented as a software product stored on a machine-readable medium (also referred to as a computer-readable medium or a processor-readable medium). The machine-readable medium may be any type of magnetic, optical, or electrical storage medium including a diskette, CD-ROM, memory device (volatile or non-volatile), or similar storage mechanism. The machine-readable medium may contain various sets of instructions, code sequences, configuration information, or other data. For example, the procedures described herein for polling network elements by network management stations can be stored on the machine-readable medium. Those of ordinary skill in the art will appreciate that other instructions and operations necessary to implement the described invention may also be stored on the machine-readable medium.

What is claimed is:

1. A method, comprising:

sending a network use digital contract from a policy administrator to a network element, wherein the network use digital contract comprises a term to allow encrypted communications from the network element to be decrypted by an entity other than addressees of the encrypted communications;

sending a network monitoring digital contract from the policy administrator to a network monitoring element;

wherein the network monitoring digital contract comprises a term to allow the network monitoring element to monitor communications from the network element, even if the encrypted communications are not addressed to the network monitoring element;

sending decrypting information from the policy administrator to the network monitoring element in accordance with the network monitoring digital contract and the network use digital contract, the decrypting information to allow the network monitoring element to monitor a decrypted version of an encrypted communication from the network element; and before sending the network monitoring digital contract to the network monitoring element, performing at least one operation from the group consisting of:

receiving a digital certificate for the network monitoring element at the policy administrator; and receiving a digital signature for the network monitoring element at the policy administrator.

2. A method according to claim 1, where, before the policy administrator sends the decrypting information to the network monitoring element, the policy administrator performs operations comprising:

receiving, at the policy administrator, a request from the network monitoring element for the decrypting information;

sending, from the policy administrator, a request to the network monitoring element for the network monitoring digital contract;

receiving, at the policy administrator, the network monitoring digital contract from the network monitoring element; and authenticating the received network monitoring digital contract.

3. A method according to claim 1, wherein sending decrypting information to the network monitoring element comprises:

sending a decryption key from the policy administrator to the network monitoring element, the decryption key to allow the network monitoring element to decrypt the encrypted communication.

4. A method according to claim 1, wherein sending decrypting information to the network monitoring element comprises:

the policy administrator decrypting the encrypted communication; and the policy administrator sending the decrypted communication to the network monitoring element.

5. A method according to claim 1, wherein, before the policy administrator sends the network monitoring digital contract to the network monitoring element, the policy administrator performs operations comprising:

receiving a digital certificate of the network monitoring element;

authenticating the digital certificate of the network monitoring element;

receiving a digital signature of the network monitoring element;

authenticating the digital signature of the network monitoring element;

writing contract terms in an electronic document;

writing the digital certificate of the network monitoring element and the digital signature of the network monitoring element in the electronic document; and writing a digital certificate of the policy administrator and a digital signature of the policy administrator in the electronic document.

6. A method according to claim 5, wherein writing contract terms in an electronic document comprises:

writing data in the electronic document to identify a time period during which the network monitoring element will be allowed to monitor decrypted versions of encrypted communications from the network element.

7. A method according to claim 1, wherein, before the policy administrator sends the network use digital contract to the network element, the policy administrator performs operations comprising:

receiving a digital certificate of the network element;

authenticating the digital certificate of the network element;

receiving a digital signature of the network element;

authenticating the digital signature of the network element;

writing contract terms in an electronic document;

writing the digital certificate of the network element and the digital signature of the network element in the electronic document; and writing a digital certificate of the policy administrator and a digital signature of the policy administrator in the electronic document.

8. A method according to claim 1, wherein the term in the network use digital contract to allow encrypted communications from the network element to be decrypted by an entity other than addressees of the encrypted communications comprises:

data to indicate that the network element has agreed to allow encrypted communications from the network element to a second network element to be decrypted by an entity other than the second network element.

9. A method, comprising:

receiving, at a network monitoring element, a network monitoring digital contract from a policy administrator, wherein the network monitoring digital contract comprises a term to allow the network monitoring element to monitor encrypted communications from a network element managed by the policy administrator, even if the encrypted communications are not addressed to the network monitoring element;

sending, from the network monitoring element to the policy administrator, a request to monitor the encrypted communications;

sending the network monitoring digital contract from the network monitoring element to the policy administrator; and after sending the network monitoring digital contract to the policy administrator, receiving, at the network monitoring element, decrypting information from the policy administrator, the decrypting information to allow the network monitoring element to monitor decrypted versions of the encrypted communications from the network element; and before receiving the network monitoring digital contract from the policy administrator, performing at least one Operation from the group consisting of:

sending a digital certificate for the network monitoring element to the policy administrator; and sending a digital signature for the network monitoring element to the policy administrator.

10. A method according to claim 9, wherein the operation of receiving decrypting information from the policy administrator comprises:

receiving, from the policy administrator, a decryption key to allow the network monitoring element to decrypt the encrypted communications from the network element.

11. A method according to claim 9, wherein the operation of receiving decrypting information from the policy administrator comprises:

receiving, from the policy administrator, decrypted versions of the encrypted communications.

12. A method, comprising:

receiving, at a network element, a network use digital contract from a policy administrator, wherein the network use digital contract comprises a term to indicate that the network element has agreed to allow encrypted communications from the network element to be decrypted by an entity other than addressees of the encrypted communications;

sending an encrypted communication from the network element;

writing, into a log, information to allow the encrypted communication to be decrypted, wherein the information is written into the log by the network element;

allowing the policy administrator to access the log to obtain the information to allow the encrypted communication to be decrypted; and before receiving the network use digital contract from the policy administrator, performing at least one operation from the group consisting of:

sending a digital certificate for the network element to the policy administrator; and sending a digital signature for the network element to the policy administrator.

13. An article, comprising:

a machine accessible medium; and instructions in the machine accessible medium, wherein the instructions;

when executed by a processing system, cause the processing system to provide a policy administrator that performs operations comprising:

sending a network use digital contract to a network element, wherein the network use digital contract comprises a term to allow encrypted communications from the network element to be decrypted by an entity other than addressees of the encrypted communications;

sending a network monitoring digital contract to a network monitoring element, wherein the network monitoring digital contract comprises a term to allow the network monitoring element to monitor communications from the network element, even if the encrypted communications are not addressed to the network monitoring element;

sending decrypting information to the network monitoring element in accordance with the network monitoring digital contract and the network use digital contract, the decrypting information to allow the network monitoring element to monitor decrypted versions of the encrypted communications from the network element; and before sending the network monitoring digital contract to the network monitoring element, performing at least one operation from the group consisting of:

receiving a digital certificate for the network monitoring element at the policy administrator; and receiving a digital signature for the network monitoring element at the policy administrator.

14. An article, comprising:

a machine accessible medium; and instructions in the machine accessible medium, wherein the instructions, when executed by a processing system, cause the processing system to provide a network monitoring element that performs operations comprising:

receiving a network monitoring digital contract from a policy administrator, wherein the network monitoring digital contract comprises a term to allow the network monitoring element to monitor communications from a network element managed by the policy administrator, even if the encrypted communications are not addressed to the network monitoring element;

sending, to the policy administrator, a request to monitor communications from the network element;

sending the network monitoring digital contract to the policy administrator; and after sending the network monitoring digital contract to the policy administrator, receiving decrypting information from the policy administrator, the decrypting information to allow the network monitoring element to monitor decrypted versions of encrypted communications from the network element; and before receiving the network monitoring digital contract from the policy administrator, performing at least one operation from the group consisting of:

sending a digital certificate for the network monitoring element to the policy administrator; and sending a digital signature for the network monitoring element to the policy administrator.

15. An article, comprising:

a machine accessible medium; and instructions in the machine accessible medium, wherein the instructions, when executed by a processing system, cause the processing system to provide a network element that performs operations comprising: receiving a network use digital contract from a policy administrator, wherein the network use digital contract comprises a term to indicate that the network element has agreed to allow encrypted communications from the network element to be decrypted by an entity other than addressees of the encrypted communications;

sending an encrypted communication from the network element;

writing, into a log, information to allow the encrypted communication to be decrypted, wherein the information is written into the log by the network element; and allowing the policy administrator to access the log to obtain the information to allow the encrypted communication to be decrypted; and before receiving the network us" digital contract from the policy administrator, performing at least one operation from the group consisting of:

sending a digital certificate for the network element to the policy administrator; and sending a digital signature for the network element to the Policy administrator.

16. An apparatus comprising:

a processor;

a machine accessible medium in communication with the processor; and instructions in the machine accessible medium, wherein the instructions, when executed by the processor, enable the apparatus to operate as a policy administrator that performs operations comprising:

sending a network use digital contract to a network element, wherein the network use digital contract comprises a term to allow encrypted communications from the network element to be decrypted by an entity other than addressees of the encrypted communications; and sending a network monitoring digital contract to a network monitoring element, wherein the network monitoring digital contract comprises a term to allow the network monitoring element to monitor communications from the network element, even if the encrypted communications are not addressed to the network monitoring element;

sending decrypting information to the network monitoring element in accordance with the network monitoring digital contract and the network use digital contract, the decrypting information to allow the network monitoring element to monitor a decrypted version of an encrypted communication from the network element; and before sending the network monitoring digital contract to the network monitoring element, performing at least one operation from the group consisting of:

receiving a digital certificate for the network monitoring element at the policy administrator; and receiving a digital signature for the network monitoring element at the policy administrator.

17. An apparatus comprising:

a processor;

a machine accessible medium in communication with the processor; and instructions in the machine accessible medium, wherein the instructions, when executed by the processor, enable the apparatus to operate as a network element that performs operations comprising:

receiving a network use digital contract from a policy administrator, wherein the network use digital contract comprises a term to indicate that the network element has agreed to allow encrypted communications from the network element to be decrypted by an entity other than addressees of the encrypted communications;

sending an encrypted communication from the network element;

writing, into a log, information to allow the encrypted communication to be decrypted, wherein the information is written into the log by the network element;

allowing the policy administrator to access the log to obtain the information to allow the encrypted communication to be decrypted; and before receiving the network use digital contract from the policy administrator, performing at least one operation from the group consisting of:

sending a digital certificate for the network element to the policy administrator; and sending a digital signature for the network element to the policy administrator.

* * * * *